(12) United States Patent
Barry

(10) Patent No.: US 7,900,482 B2
(45) Date of Patent: Mar. 8, 2011

(54) KNITTING TOOL

(76) Inventor: Barbara Barry, Naples, FL (US)

(*) Notice: Subject to any disclaimer, the term of this patent is extended or adjusted under 35 U.S.C. 154(b) by 137 days.

(21) Appl. No.: 12/200,890

(22) Filed: Aug. 28, 2008

(65) Prior Publication Data

US 2010/0050697 A1  Mar. 4, 2010

(51) Int. Cl.
  *D04B 3/00* (2006.01)
(52) U.S. Cl. .......................................................... 66/1 A
(58) Field of Classification Search ................. 66/1 A, 66/1 R, 1.5, 116–118; 33/759, 760, 761, 33/762, 769

See application file for complete search history.

(56) References Cited

U.S. PATENT DOCUMENTS

| | | | | |
|---|---|---|---|---|
| 2,032,547 A * | 3/1936 | Meade | ............................ | 40/111 |
| 2,588,935 A * | 3/1952 | Oran | ........................ | 235/117 R |
| 2,806,286 A * | 9/1957 | Weiner | ............................ | 33/2 R |
| 2,821,593 A * | 1/1958 | Sogorka, Jr. et al. | ....... | 200/83 C |
| 2,918,035 A * | 12/1959 | Sanders | ........................ | 116/317 |
| 4,470,273 A * | 9/1984 | Rogers et al. | ................... | 66/1 A |
| 4,478,330 A * | 10/1984 | Lin | ................................ | 206/38 |
| 4,542,589 A * | 9/1985 | Yamamoto | ..................... | 33/760 |
| 4,697,349 A * | 10/1987 | Lee | ............................... | 33/27.03 |
| 7,040,035 B1 * | 5/2006 | Scarborough | .................. | 33/668 |
| 7,125,145 B2 * | 10/2006 | Gardiner et al. | ............. | 362/253 |
| 7,252,193 B1 * | 8/2007 | Lewis et al. | .................... | 206/373 |
| 7,254,855 B2 * | 8/2007 | McCreesh | .......................... | 7/164 |

* cited by examiner

*Primary Examiner* — Danny Worrell
(74) *Attorney, Agent, or Firm* — Muskin & Cusick LLC

(57) ABSTRACT

A knitting tool that has a measuring tape, a retractable crochet hook, a cutting blade, a counter, and a compartment for scissors, rings, and other knitting accessories combined in a single tool. The crochet hook can be retractable.

5 Claims, 6 Drawing Sheets

KNITTING TOOL

BACKGROUND OF THE INVENTION

1. Field of the Invention

The present inventive concept relates to a system and method for a knitting tool which performs numerous functions in a single tool.

2. Description of the Related Art

A knitter typically needs different apparatus in order to knit effectively. For example, the knitter can use a rule in order to measure the lengths of articles (e.g., sleeve lengths on a sweater.) A knitter can also use a crochet hook in order to grab and repair missed stitches in the article. A knitter can also use a thread cutter to facilitate the cutting of thread and yarn. Knitters can also use other articles, such as scissors, needles, and counters for counting rows of colors and/or stitches.

What is needed is a mechanism where a knitter can conveniently utilize numerous knitting utensils in a single article.

SUMMARY OF THE INVENTION

It is an aspect of the present general inventive concept to provide an improvement to knitting tools.

The above aspects can be obtained by an apparatus that includes (a) a counter button located on an outside of the apparatus to increment a counter readout; (b) a rotatable hub inside the apparatus; and (c) a retractable tape measure wrapped around the rotatable hub.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1B:
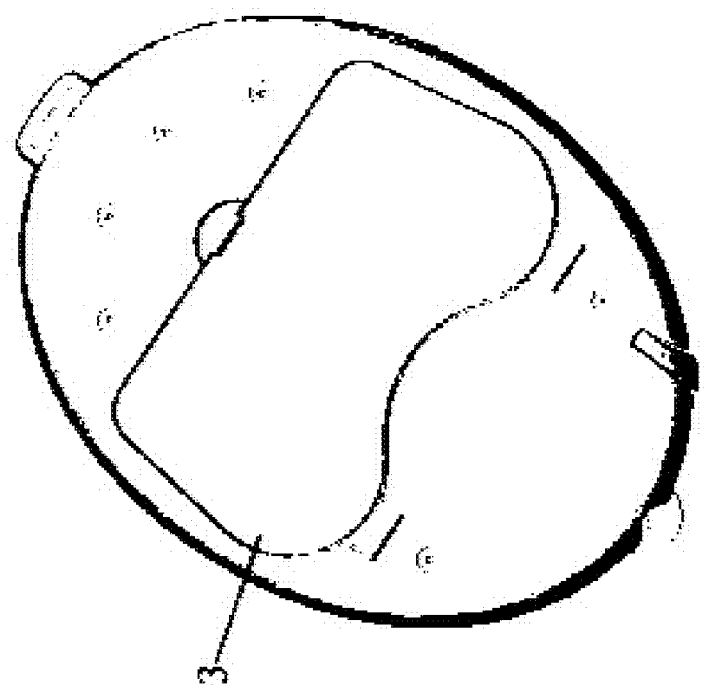
FIG. 1B is a flat bottom view of a knitting tool, according to an embodiment.

Reference will now be made in detail to the presently preferred embodiments of the invention, examples of which are illustrated in the accompanying drawings, wherein like reference numerals refer to like elements throughout.

The general inventive concept relates to a knitting tool which provides numerous functions for a knitter all in a single tool. A counter, thread cutter, and tape measure can be integrated within a same tool and connected (directly or indirectly) to a common housing so they cannot be lost (apart from losing the tool). The counter and tape measure are fully functional from the tool itself, without having to remove them from a box of drawer. The tape measure extends from and retracts directly into the tool.

Figure 1A:
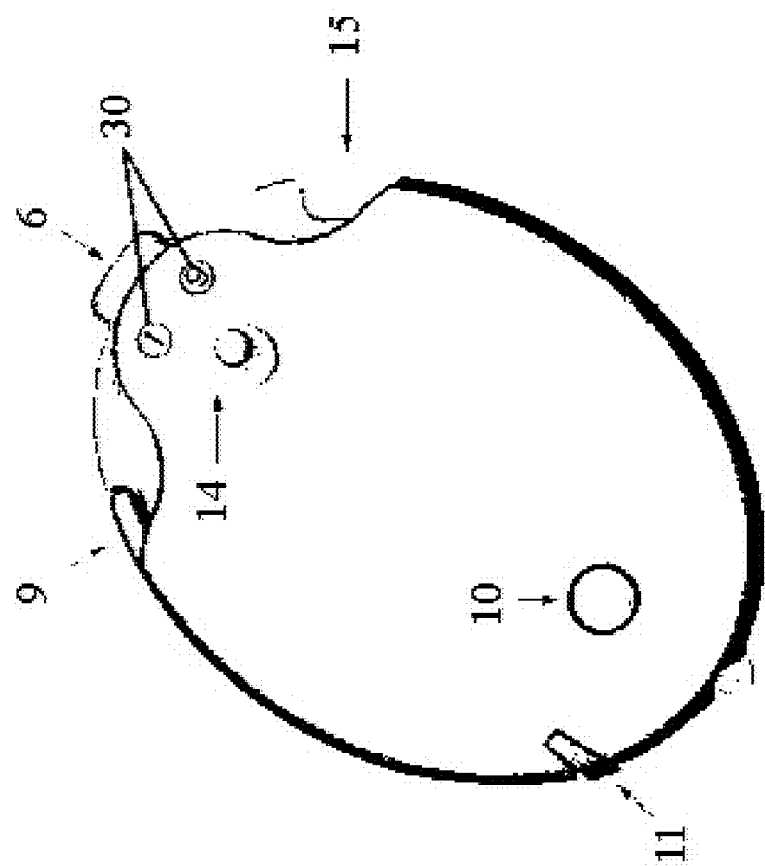
FIG. 1A is a flat top view of a knitting tool, according to an embodiment.

FIG. 1A is a flat top view of a knitting tool, according to an embodiment.

A counter button 6 is used by a user to increment a counter readout 30. A crochet hook 9 is in a retracted position. A lock button 14 is used to lock the counter readout 30 into place so that pressing the counter button 6 has no effect. A tape end 11 is an end of a measuring tape which is retracted inside the tool but can be extended by pulling outward on the tape end 11. A tape button 10 is used to activate a power spring (not pictured) to automatically retract the measuring tape inside the tool.

FIG. 1B is a flat bottom view of a knitting tool, according to an embodiment.

A housing door 3 opens to reveal a compartment which can hold miscellaneous items such as scissors, needles, stitch markers, point protectors, rings, etc. When the housing door 3 is closed, the housing door 3 can also (in an embodiment) be locked (using a key or other locking mechanism).

Figure 2:
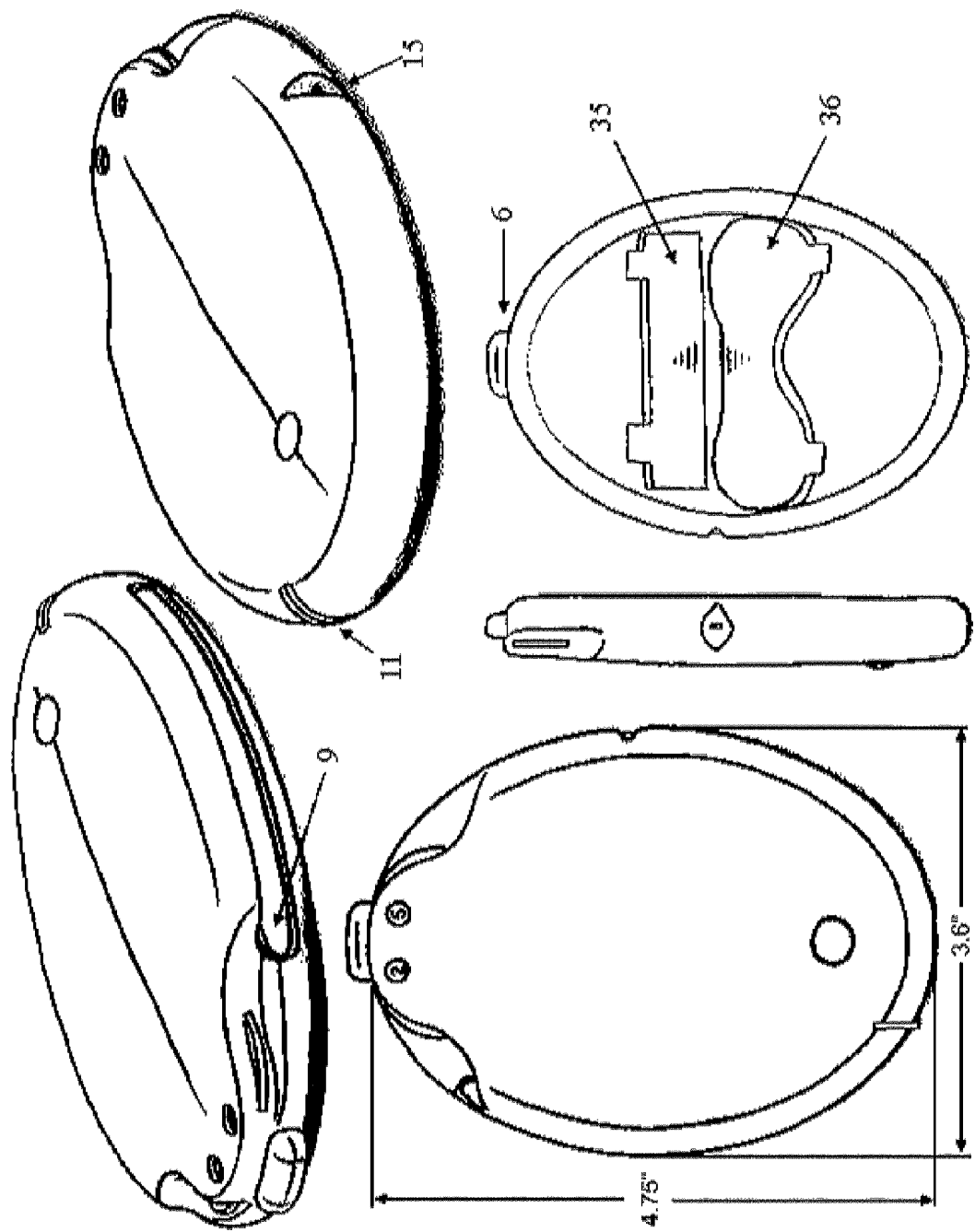
FIG. 2 combines orthogonal, flat and a side view of a knitting tool, according to an embodiment.

FIG. 2 combines orthogonal, flat and a side view of a knitting tool, according to an embodiment.

A crochet hook 9 is shown in a retracted position. A tape end 11 is an end of measuring tape (not pictured). A counter button 6 is used to advance the counter readout. A thread cutter 15 is a sharp blade which can be used to cut knitting material (thread, yarn, etc.).

A ring compartment 35 can open to hold rings while a scissors compartment 36 can open to hold scissor(s). This embodiment differs than that pictured in FIGS. 1 and 4 which has a single compartment which holds all of these items.

The dimensions of the tool shown are 4.75 inches long by 3.6 inches wide. However, this is merely one possible set of dimensions, and it can be appreciated that a tool can be constructed using other dimensions as well. However, it is preferred that the tool is sized such that it will fit in a palm of an average hand.

Figure 3:
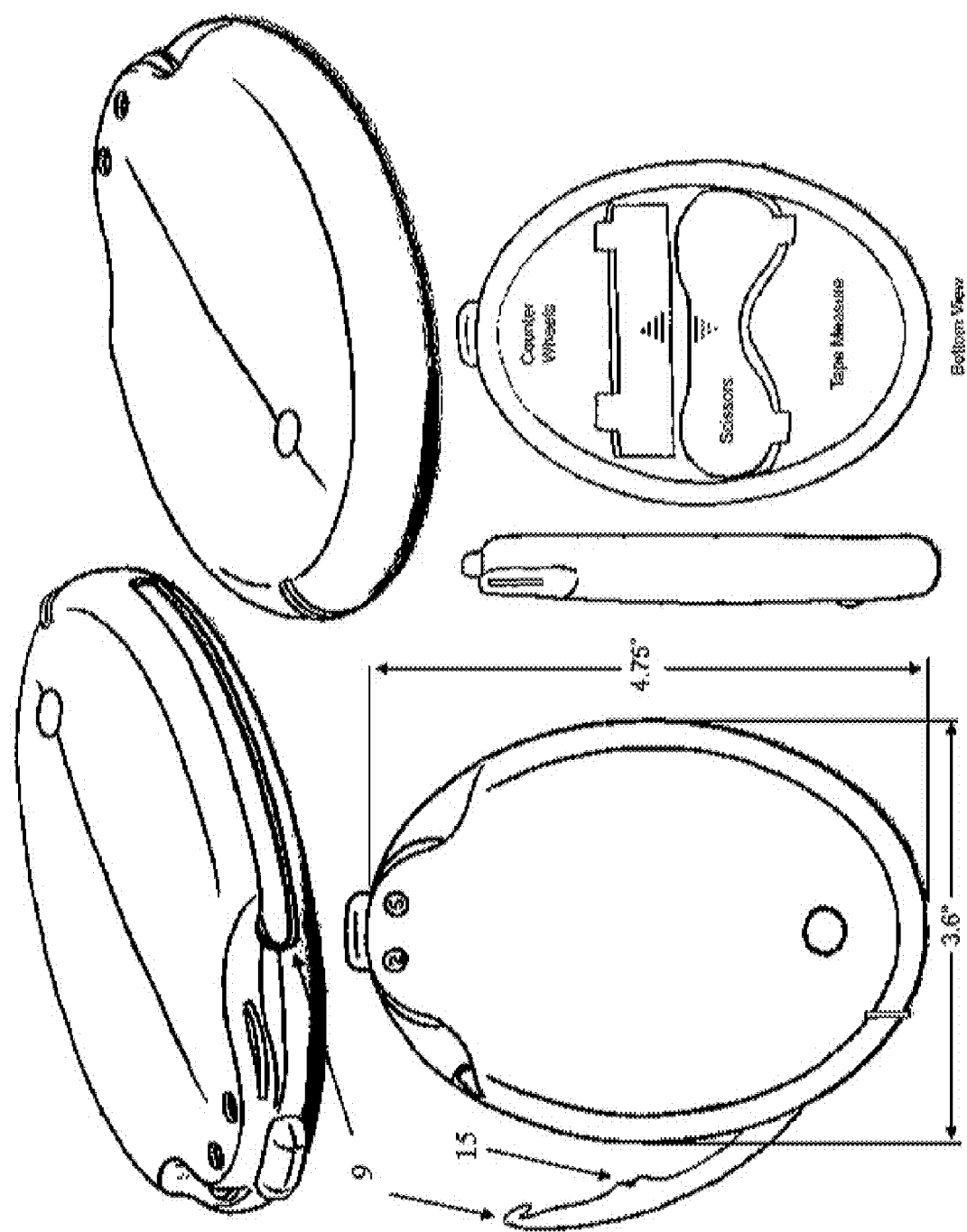
FIG. 3 combines orthogonal, flat and a side view of a knitting tool with a crochet hook extended, according to an embodiment.

FIG. 3 combines orthogonal, flat and a side view of a knitting tool with a crochet hook extended, according to an embodiment.

The crochet hook 9 can slide open (as illustrated in FIG. 3) and closed (as illustrated in FIG. 2). A thread cutter 15 can be a jack knife style (or any sharp instrument) and is also attached to the tool.

Figure 4:
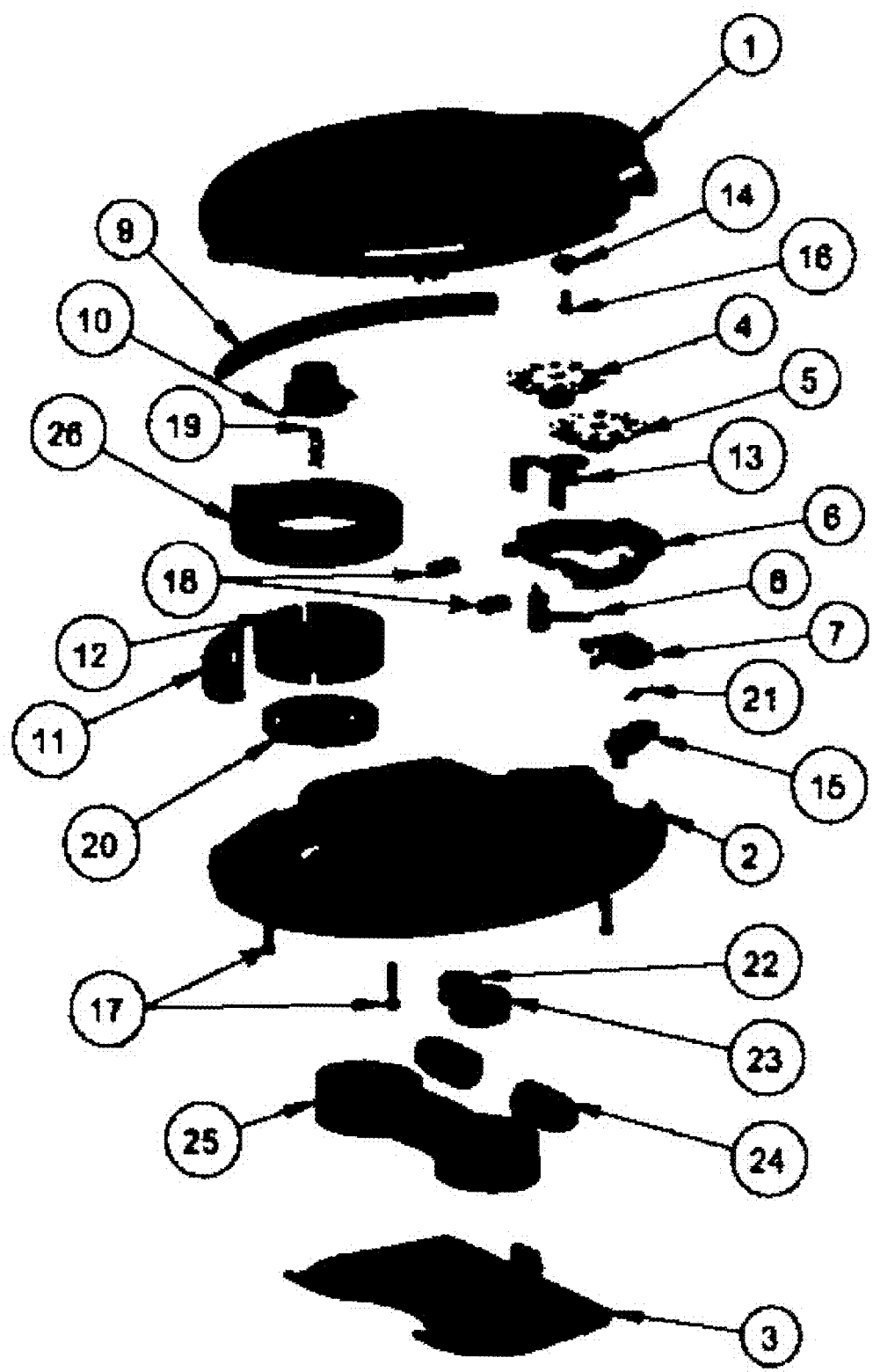
FIG. 4 is disassembled view of a knitting tool, according to an embodiment.

FIG. 4 is disassembled view of a knitting tool, according to an embodiment.

A housing has a top housing 1 and a bottom housing 2. A housing door 3 opens to a compartment which can store miscellaneous items such as a small ring 22, a large ring 23, scissors 25, and needle tips 24. A first counter wheel 4 displays the first digit of the counter while a second counter wheel 5 displays a second digit of the counter. A counter button 6 is pressed in order to increment the counter. A counter button insert 7 is used to hold the counter button 6 into place. A counter control 8 is used to mechanically advance a counter readout (e.g., the first digit of the counter and/or the second digit of the counter). A lock button 14 is used to lock the a counter lock 13 into place which locks the counter to its current readout (e.g., prevents the counter button 6 from being operated).

A crochet hook 9 is attached to the housing (top housing 1, bottom housing 2, or both). A tape button 10 communicates with a first spring 19 and is used to retract measuring tape 26. A tape end 11 is at an end of the measuring tape 26. The measuring tape 26 wraps around a circular tape hub 12. When the measuring tape 26 is extended outside of the tool, the tape hub 12 rotates. When the measuring tape 26 is retracted inside of the tool, the tape hub 12 rotates in the opposite direction to collect the measuring tape 26 which wraps around the tape hub 12. A thread cutter 15 is attached to the bottom housing 2 (although alternatively it can be attached to the top housing 1). A blade 21 is located at an end of the thread cutter 15.

A first screw 16 is used to secure the lock button 14 to the top housing 1. A second screw 17 is used to connect the bottom housing 2 to the top housing 1. Additional screws can also be used to connect the bottom housing 2 to the top housing 1. Second springs 18 are used to enable the counter button 6. A power spring 20 is used to automatically retract the measuring tape 26.

Figure 5:
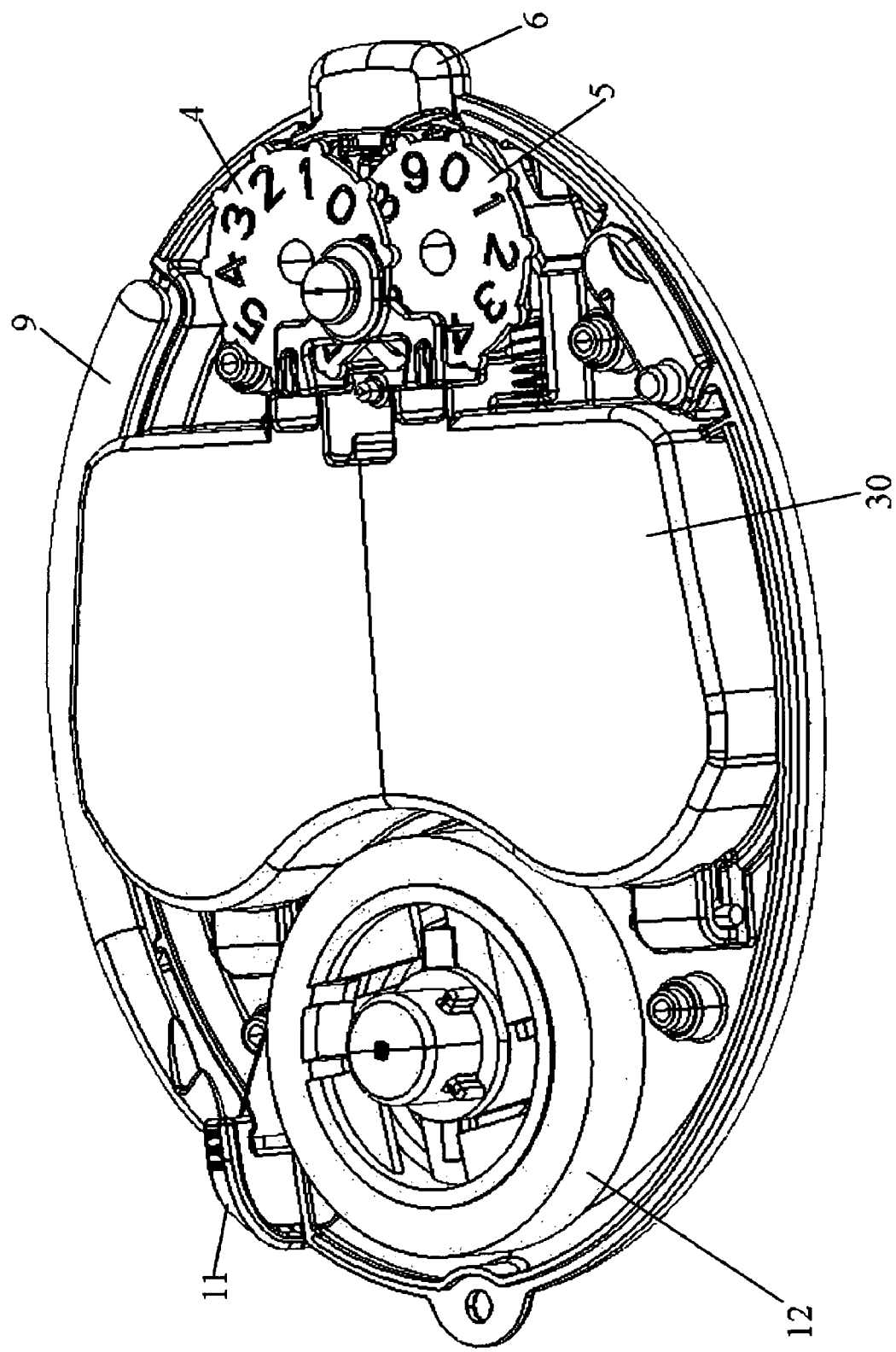
FIG. 5 is a cutaway perspective drawing showing the tool with the top housing removed, according to an embodiment.

FIG. 5 is a cutaway perspective drawing showing the tool with the top housing removed, according to an embodiment.

Visible is the tape hub 12, the tape end 11, the crochet hook 9, counter button 6, first counter wheel 4, second counter wheel 5, and compartment 30. The housing door is located on an opposite side and it not visible in FIG. 5.

Figure 6:
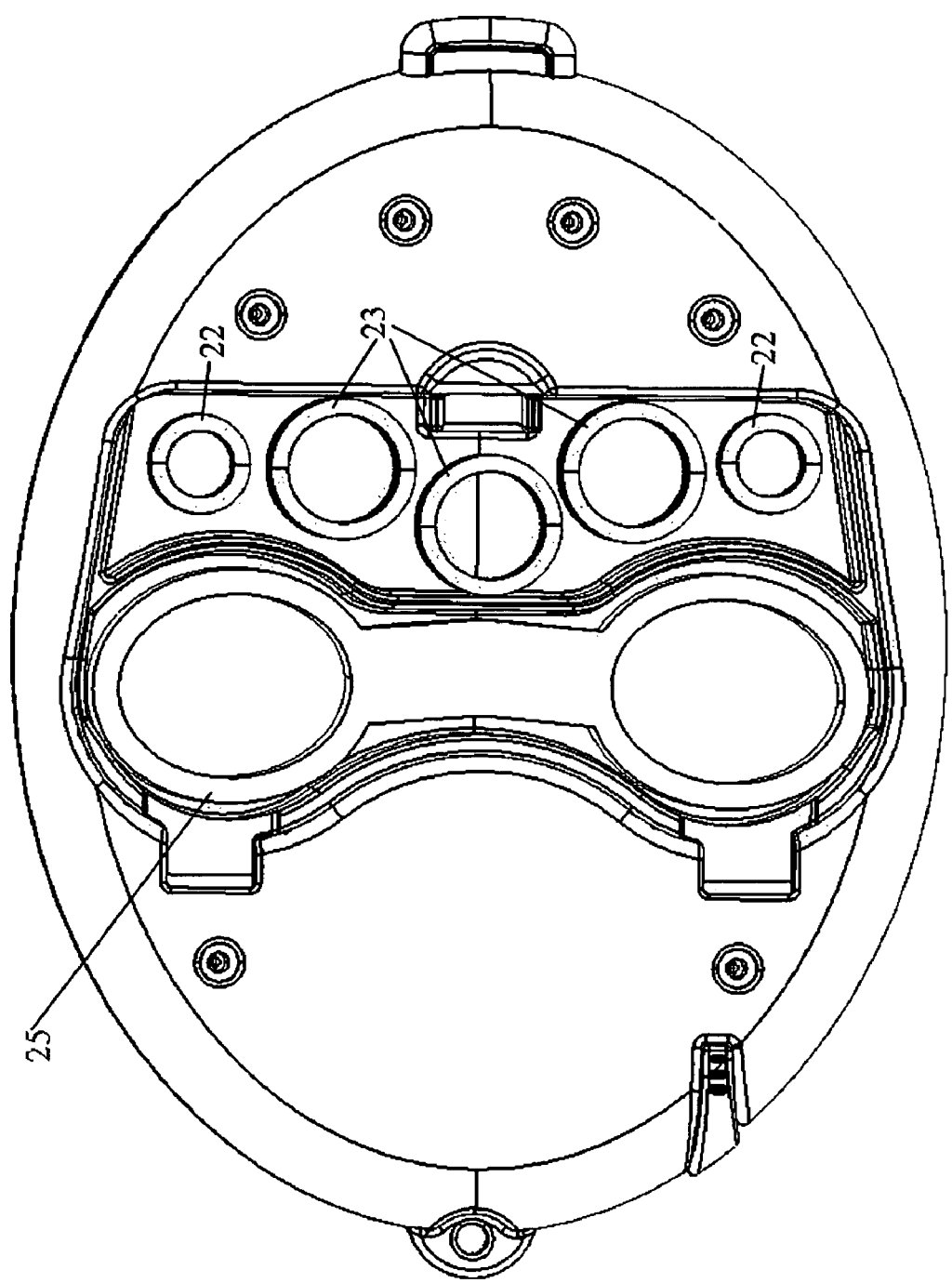
FIG. 6 is a perspective drawing of a bottom of the tool with the housing door removed, according to an embodiment.

FIG. 6 is a perspective drawing of a bottom of the tool with the housing door removed, according to an embodiment.

The housing door is removed in FIG. 6 to show how various items can be stored inside the compartment. Various items can be stored therein, such as scissors 25, small rings 22, and large rings 22.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus comprising:
    an ovular housing with substantially flat upper and lower surfaces;
    a counter button located on an outside top portion of the housing to increment a counter readout, the counter readout located just below the button;
    a rotatable hub located inside the housing and located in a bottom portion of the housing, the bottom portion of the housing being opposite the top portion of the housing;
    a retractable tape measure wrapped around the rotatable hub, wherein a first axis is defined as passing through the top portion of the housing and the bottom portion of the housing, and the rotatable hub rotates around a rotational axis, the rotational axis being substantially perpendicular to the first axis, the rotatable hub rotating in plane generally parallel to the upper and lower surfaces; and
    a compartment located in a middle portion of the housing between the counter button and the rotatable hub, the compartment adapted to store items, the compartment comprising a door to provide access.

2. The apparatus as recited in claim 1, further comprising a curved crochet hook.

3. The apparatus as recited in claim 2, wherein the curved crochet hook is movable into an extended and retracted position, wherein when the curved crochet hook is in the retracted position the curved crochet hook corresponds with an outside perimeter of the ovular housing.

4. The apparatus as recited in claim 1, further comprising a thread cutter.

5. The apparatus as recited in claim 1, wherein the compartment is adapted to be locked.

\* \* \* \* \*